3,243,346
THIAZOLIDINE-4-CARBOXYLIC ACID AND ITS ESTER IN A HAIR COMPOSITION METHOD

Günther Bechmann, Hamburg-Altona, Heinz Lukesch, Hamburg-Sasel, and Paul Rambacher, Rosenhein-Mitterfeld, Germany, assignors to Aschaffenburger Zellstoffwerke A.G., Redenfelden, Upper Bavaria, Germany
No Drawing. Filed Nov. 28, 1961, Ser. No. 155,475
Claims priority, application Germany, Nov. 30, 1960, Sch 28,852
16 Claims. (Cl. 167—87)

This invention relates to a composition and method of using an improved hair tonic.

The principal object of the present invention, therefore, is to provide an improved hair tonic.

Another object is to provide an essential component of hair tonics, which essential component is stable and can be stored without danger of decomposition or deactivation.

Still other objects and advantages of the present invention will become apparent upon further study of the specification and appended claims.

To accomplish the objects of this invention, it is necessary to employ as the active ingredient a 4-substituted L-thiazolidine compound having at the 4-position a carboxylic acid or a radical capable of forming a carboxylic acid by oxidation or hydrolyzing. The 4-substituted thiazolidine compound conforms to the following structural formula:

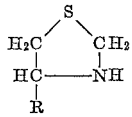

wherein R is a carboxylic acid group, —COOH, or a functional acid derivative capable of being formed into the free acid, for example a hydrolytically cleavable ester such as —COOCH$_3$, —COOC$_2$H$_5$, —COOC$_{16}$H$_{33}$, intermediate and higher homologs not being precluded, or a hydrolyzable acyl group or an oxidizable aldehyde group.

The L-thiazolidine-4-carboxylic acid can be formed for example at room temperature by the insertion of the carbon of formaldehyde between S and N in a cystein molecule to produce a saturated ring, Ratner, S. and Clarke, H.T., J. Am. Chem. Soc. 59,200 (1937).

It has been discovered that solutions of L-thiazolidine-4-carboxylic acid or of L-thiazolidine having at the 4-position a group which can form a carboxylic acid group by hydrolysis and/or oxidation.

The 4-substituent of the L-thiazolidine according to this invention, may be an oxymethyl group which can be converted into a carboxyl group by oxidation, or an ester group, which is hydrolytically cleaved into a carboxyl group and an alcohol. Examples of preferred esters are thiazolidine-4-carboxy-acid methylester, ethylester and -cetylester. Of course, it is also possible to esterify the thiazolidine-4-carboxy acid with other alcohols especially with those alcohols which add a cosmetic effect to the thiazolidine compound. The cosmetically active alcohol substituent may or may not contain one or more hydrophilic groups, a preferred example being panthenol,

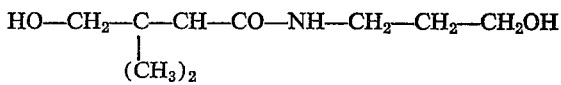

In general, the L-thiazolidine derivative can be employed with a carrier, the preferred concentration being less than 750 parts by weight per 100 parts of carrier. The carrier can be of any physical state, e.g., solution, emulsion, paste, solid, and the carrier can contain other ingredients which perform other functions, such as those employed cleansing and grooming the hair, etc. Conventionally, the carrier is primarily water or a mixture of water and an alcohol such as ethanol, isopropanol, and stearyl alcohol.

Furthermore, additives which can increase the wettability of the epidermis, having a penetration promoting effect; for example, polyoxyethylenesorbitanmonolaurate, or lanolin or lanolin-like products serve as preferred vehicles for the penetration of the lipoid barrier. It is, moreover, desirable to combine the thiazolidine derivatives in cosmetic preparations containing the conventional ingredients found in commercial tonics, to obtain a more efficacious cosmetic effect. The solution may also contain the usual additives, such as solvents, fatty materials, thickeners, preservatives and perfumes. The pH of the solution is preferably neutral, whereby the L-thiazolidine-4-carboxy acid is either a salt or slightly acid. As salts there can be employed for example $C_4H_6NS_2Na$      $C_4H_6O_2NS.N(C_2H_5OH)_3$
$C_4H_6O_2NS.NH_4$      $C_4H_6NS.C_4H_9NO$ The thiazolidine derivatives, according to this invention, may be used in lotions, medicated packs, shampoos, and hair tonics. As the derivatives are not attacked by air and are inverted (as compared to the usual cosmetic additives), the corresponding preparations will not change even under the influence of air, so that they are practically of unlimited durability.

The preparations as described in the invention, are particularly intended for the topical treatment of the hair, the scalp, including eyebrows and lashes.

For purposes of illustration, the following examples are preferred embodiments of hair treating compositions according to this invention, which examples however are not to be considered limitative of the specification and appended claims.

Example I.—Hair tonic

| | Percent |
|---|---|
| L-thiazolidine-4-carboxylic acid | 0.500 |
| Condensation product of fatty acid with polyethylene glycol | 0.250 |
| Wheat germ oil | 0.100 |
| Ethyl alcohol | 45.000 |
| Menthol | 0.100 |
| Perfume | Trace |
| H$_2$O | 54.050 |
| | 100.000 |

Example II.—Hair tonic

| | Percent |
|---|---|
| L-thiazolidine-4-carboxylic acid methylester | 0.500 |
| Isopropyl alcohol | 50.000 |
| Lecithin (alcohol-soluble) | 0.200 |
| Resorcinol monoacetate | 0.020 |
| Camomile | 0.150 |
| Polyoxyethylene-sorbitanmonolaurate | 0.200 |
| Perfume | Trace |
| H$_2$O | 48.930 |
| | 100.000 |

*Example III.—Hair treatment composition*

| | Percent |
|---|---|
| Stearyl alcohol | 9.000 |
| Walrat (cetaceum) | 3.500 |
| Castor oil | 1.500 |
| Detergent (arylalkylsufate) | 6.000 |
| "Nipagin," p-hydroxybenzoic acid-methylester | 0.150 |
| Thiazolidine-4-carboxylic acid-cetylester | 1.000 |
| Salicylic acid | 0.450 |
| Perfume | Trace |
| Dye | Trace |
| H$_2$O | 78.300 |
| | 100.000 |

*Example IV.—Hair treatment composition*

| | Percent |
|---|---|
| Glycerol monostearate | 8.000 |
| Walrat (cetaceum) | 2.000 |
| Detergent (arylalkylsulfate) | 9.000 |
| Glycerin | 2.000 |
| Cetyl alcohol | 5.000 |
| Preservative | Trace |
| Thiazolidine-4-carboxylic acid | 1.000 |
| Perfume | Trace |
| Dye | Trace |
| H$_2$O | 73.000 |
| | 100.000 |

From the foregoing description, one skilled in the art can easily acertain the essential characteristics of this invention, and without departing from the spirit and scope thereof, can make various changes and modifications of the invention to adapt it to various usages and conditions. Consequently, such changes and modifications are proper, equitable and intended to be within the full range of equivalence of the following claims.

What is claimed is:

1. A method of treating hair comprising topically applying thereto an effective amount of a compound selected from the group consisting of L-thiazolidine-4-carboxylic acid, L-thiazolidine-4-oxymethyl, L-thiazolidine-4-carboxymethyl ester, L-thiazolidine-4-carboxyethyl ester, L-thiazolidine-4-carboxy-cetyl ester, L-thiazolidine-4-carboxyphanthenol ester, sodium salt of I-thiazolidine4-carboxylic acid, ammonium salt of L-thiazolidine-4-carboxylic acid, C$_4$H$_6$NS.N(C$_2$H$_5$OH)$_3$ and C$_4$H$_6$NS.C$_4$H$_9$NO.

2. The method of claim 1, wherein the compound is applied to the scalp.

3. The method of claim 1, wherein the compound is applied to the eyebrows.

4. The method of claim 1, wherein the compound is applied to the eyelashes.

5. A method of treating hair comprising topically applying thereto an effective amount of L-thiazolidine-4-carboxylic acid.

6. The method of claim 1, wherein said compound is the sodium salt of L-thiazolidine-4-carboxylic acid.

7. The method of claim 1, wherein said compound is L-thiazolidiene-4-carboxy-cetyl ester.

8. The method of claim 1, wherein said compound is L-thiazolidine-4-carboxy-panthenol ester.

9. The method of claim 1, wherein said compound is L-thiazolidine-4-carboxy-methyl ester.

10. The method of claim 1, wherein said compound is L-thiazolidine-4-carboxy-ethyl ester.

11. A hair tonic consisting of

| | Percent |
|---|---|
| L-thiazolidine-4-carboxylic acid | 0.500 |
| Polyoxyethylene-sorbitanmonolaurate | 0.250 |
| Wheat germ oil | 0.100 |
| Ethyl alcohol | 45.000 |
| Menthol | 0.100 |
| Perfume | Trace |
| H$_2$O | 54.050 |

12. A hair tonic consisting of

| | Percent |
|---|---|
| L-thiazolidine-4-carboxylic acid methyl ester | 0.500 |
| Isopropyl alcohol | 50.000 |
| Alcohol-soluble lecithin | 0.200 |
| Resorcinol monoacetate | 0.020 |
| Camomile | 0.150 |
| Polyoxyethylene-sorbitanmonolaurate | 0.200 |
| Perfume | Trace |
| H$_2$O | 48.930 |

13. A hair treatment composition consisting of

| | Percent |
|---|---|
| Stearyl alcohol | 9.000 |
| Cetaceum | 3.500 |
| Castor oil | 1.500 |
| Arylalkylsulfate | 6.000 |
| p-Hydroxybenzoic acid methyl ester | 0.150 |
| Thiazolidine-4-carboxylic acid cetyl ester | 1.000 |
| Salicylic acid | 0.450 |
| Perfume | Trace |
| Dye | Trace |
| H$_2$O | 78.300 |

14. A hair treatment composition consisting of

| | Percent |
|---|---|
| Glycerol monostearate | 8.100 |
| Cetaceum | 2.000 |
| Arylalkylsulfate | 9.000 |
| Glycerin | 2.000 |
| Cetyl alcohol | 5.000 |
| Preservative | Trace |
| Thiazolidine-4-carboxylic acid | 1.000 |
| Perfume | Trace |
| Dye | Trace |
| H$_2$O | 73.000 |

15. A hair treatment composition consisting of

| | Percent |
|---|---|
| Isopropyl alcohol | 50.000 |
| Sodium thiosulfate | 0.250 |
| Resorcinol monoacetate | 0.020 |
| Camphor | 0.005 |
| Polyoxyethylene-sorbitanmonolaurate | 0.200 |
| Sodium salt of L-thiazolidine-4-carboxylic acid | 0.100 |
| Perfume | 0.700 |
| H$_2$O | 48.725 |

16. A hair treatment composition consisting of

| | Percent |
|---|---|
| Polyoxyethylene-sorbitanmonolaurate | 0.100 |
| Wheat germ oil | 0.050 |
| Isopropyl alcohol | 50.000 |
| Sodium salt of L-thiazolidine-4-carboxylic acid | 0.150 |
| Water | 49.700 |

References Cited by the Examiner

UNITED STATES PATENTS

| | | | |
|---|---|---|---|
| 2,563,034 | 8/1951 | Greshan | 260—306.7 |
| 2,678,929 | 5/1954 | Grundy et al. | 260—306.7 |
| 2,928,772 | 3/1960 | Anderson | 167—87 |
| 2,960,442 | 11/1960 | Schwarz | 167—87 |

(Other references on following page)

FOREIGN PATENTS

| | | |
|---|---|---|
| 1,037,462 | 8/1958 | Germany. |
| 608,925 | 9/1948 | Great Britain. |
| 759,199 | 10/1956 | Great Britain. |

OTHER REFERENCES

Atlas Guide, Atlas Podwer Co., Wilmington, Del., pp. 12–18.

Chemical Abstracts, 41:30 57C, 1947.

Chemical Abstracts, vol. 44; 9429a (1950).

Chemical Abstracts, vol. 45; 6628e (1951).

Harry: Modern Cosmeticology, vol. 1, pp. 332, 334, 339, and 341–343 (1962).

Sagarin: Interscience Publishers Inc., New York 1957, pp. 641–650.

Schimmel Briefs, No. 271, October 1957, 1 page.

JULIAN S. LEVITT, *Primary Examiner.*